United States Patent [19]

Samish et al.

[11] Patent Number: 4,521,388

[45] Date of Patent: Jun. 4, 1985

[54] $NO_x$ REDUCTION IN FLUE GAS

[75] Inventors: Norman C. Samish, Houston, Tex.; Jack B. Pohlenz, Arlington Heights, Ill.

[73] Assignee: Shell California Production Inc., Houston, Tex.

[21] Appl. No.: 594,010

[22] Filed: Mar. 27, 1984

[51] Int. Cl.³ .......................... C01B 21/00; B01J 8/00
[52] U.S. Cl. .................................... 423/235; 423/239
[58] Field of Search ................. 423/239, 239 A, 235, 423/235 A

[56] References Cited

U.S. PATENT DOCUMENTS

| | | | |
|---|---|---|---|
| 4,129,651 | 12/1978 | Koike et al. | 423/235 |
| 4,224,292 | 9/1980 | Uchida et al. | 423/239 |
| 4,388,281 | 6/1983 | Holter et al. | 423/242 X |

Primary Examiner—Gregory A. Heller

[57] ABSTRACT

A selective catalytic reduction process (SCR) for reducing the oxides of nitrogen ($NO_x$) content of a furnace flue gas. The process comprises splitting the flue gas into two streams, treating one of the streams with an SCR process with the same amount of $NH_3$ as $NO_x$, and then recombining the streams. By treating only a portion of the flue gas using an $NH_3/NO_x$ ratio of unity, the amount of catalyst required is reduced while the residual $NO_x$ and $NH_3$ contents of the recombined streams is controlled to desired levels.

3 Claims, 2 Drawing Figures

$NO_x$ REDUCTION IN FLUE GAS

BACKGROUND OF THE INVENTION

The present invention relates to the reduction of oxides of nitrogen, hereinafter referred to as $NO_x$, in stack gases, particularly to gases resulting from the combustion of coal. The invention can also be used to reduce $NO_x$ from other combustion processes involving oil or natural gas. The invention is further related to a reduction of $NO_x$ using selective catalytic reduction in which ammonia, oxygen and a suitable catalyst are employed to reduce the $NO_x$ to water and nitrogen, and where the amount of ammonia escaping the process must be held to low values.

There are two approaches to controlling $NO_x$ emissions resulting from the combustion of hydrocarbon fuels. One is to control the combustion to limit the $NO_x$ formation and the second is to process the flue gas to reduce the $NO_x$ to nitrogen and water. One of the flue gas treating processes involves adding ammonia ($NH_3$) as a reducing agent either with or without a catalyst for the selective reduction of the $NO_x$ to nitrogen and water. When a catalyst is used the process is referred to as selective catalytic reduction (SCR) and without a catalyst the process is referred to as selective noncatalytic reduction (SNCR). In the SNCR process there is a very narrow temperature window where $NO_x$ reduction occurs. This temperature is around 1740° F. and if temperatures are reduced below about 1600° F. the rate of reduction of $NO_x$ falls off drastically and the $NH_3$ flows through the process without being reacted with the $NO_x$. At temperatures higher than about 1900° F. the injected $NH_3$ burns to form additional $NO_x$. The characteristics of the process are a high $NH_3$ requirement and high $NH_3$ concentrations in the treated gas. In order to reduce the optimum reaction temperature and broaden the temperature window, the use of catalyst has been incorporated with reduction processes using $NH_3$. This combination reduces the temperature to a range of 550° F. to 750° F., which is convenient because it is the temperature of the gas leaving the economizer in a typical furnace. Various systems and processes are described in the prior art for carrying out a selective catalytic reduction of $NO_x$, as well as various catalysts that can be used.

All of the above gas treating systems circulate or pass all of the stack gas through the catalyst bed and then discharge it to the atmosphere. No commercial SCR processes are used on coal-fired boilers in the U.S., although many large installations are in use in Japan. In Japan, the $NO_x$ is not normally reduced by more than 40 to 80 percent as it passes through the catalyst bed. Ammonia is added to the $NO_x$ in the flue gas in a mole ratio ($NH_3/NO_x$) of approximately 0.45 to 0.85 to obtain the required reduction. After passing through the catalyst bed, the stack gas is normally passed to an air preheater or similar device to increase the overall efficiency of the boiler. On coal-fired systems this requires that the $NH_3$ be held to a low level, typically 5 ppm or less, to prevent sticky fly ash deposits of ammonia salts and plugging in the air preheater. The low level of $NH_3$ requires a large amount of catalyst to ensure complete reaction of $NH_3$ and $NO_x$.

From the above brief description of selective catalytic reduction systems on coal-fired boilers, it can be seen that the need to maintain the residual $NH_3$ at low levels requires large amounts of catalyst. This is expensive both in capital cost and in operating cost, and it would be desirable to reduce these costs by reducing the amount of catalyst required.

SUMMARY OF THE INVENTION

The present invention reduces the cost of catalyst by treating only a portion of the flue gas and then recombining the treated portion with the remainder of the flue gas. The system splits the stack gas stream into two streams, with one of the streams being processed through the SCR unit where the $NO_x$ is reduced to a very low level; i.e., the percentage $NO_x$ reduction is large. This stream is then recombined with the second stream and passed through the air preheater and then discharged to the atmosphere. By reducing the $NO_x$ level of the processed stream to a low level, the $NO_x$ level of the recombined stream will be reduced to desired levels without exceeding allowable concentrations of residual ammonia.

The SCR unit which treats the processed stream can be considerably smaller than the unit required if the complete stack gas flow was passed through the SCR unit. This is because the smaller SCR unit treats the gas to a higher level of $NO_x$ removal than a full-size SCR unit. Since the unit is smaller the amount of the required catalyst and the expense is substantially reduced.

The invention thus improves the efficiency of operation of the SCR unit since, when the complete stack gas flow is passed through the SCR unit, the $NO_x$ reduction of the unit is limited or controlled by the $NH_3$ limits of the air preheater. This limit is normally in the range of 5 parts per million or less. In contrast, with the bypass arrangement of the present invention, the $NH_3$ in the treated gas is diluted to lower concentration (5 parts per million maximum) by mixing the treated and untreated portions before heat exchange in the air preheater; hence the controlling factor is the desired amount of $NO_x$ reduction. Thus, the residual $NH_3$ leaving the SCR unit can be higher than 5 parts per million, the limit imposed by the air preheater.

BRIEF DESCRIPTION OF THE DRAWINGS

The present invention will be more easily understood from the following description when taken in conjunction with the attached drawings in which.

DESCRIPTION OF A PREFERRED EMBODIMENT

Figure 1:
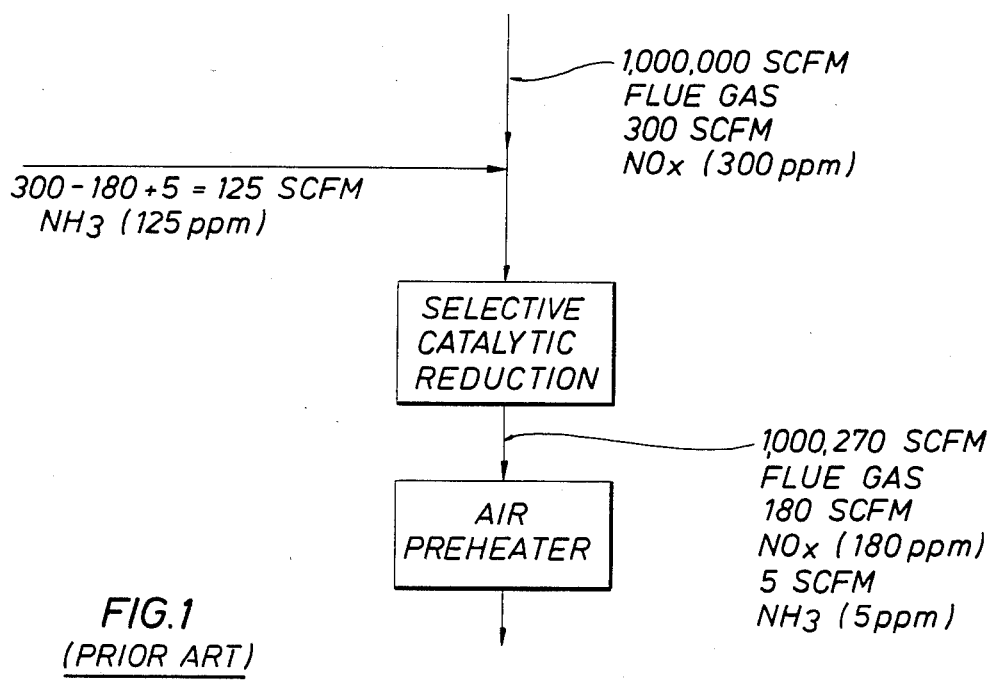
FIG. 1 shows a conventional SCR $NO_x$ reduction system.

Referring now to FIG. 1, there is shown a conventional SCR unit for reducing $NO_x$ emissions. As shown, it is assumed that the stack discharges 1 million standard cubic feet per minute (SCFM) of gas and 300 SCFM of $NO_x$. It is desired to reduce the $NO_x$ to 180 SCFM, or a reduction of 40 percent while the gas entering the downstream air preheater is limited to a 5 parts per million maximum of $NH_3$.

Over the temperature range in which the combustion of $NH_3$ is small, $NH_3$ reacts with $NO_x$ in the following relationship:

$$4NH_3 + 4NO_x + O_2 \rightarrow 6H_2O + 4N_2$$

From this it can be seen that the $NO_x$ and $NH_3$ react on a straight mole-to-mole relationship. If 120 SCFM of $NO_x$ is to be removed from the flue gas, one will be required to add 120 SCFM of $NH_3$ plus the allowed excess of $NH_3$. Since the $NH_3$ carryover is limited to 5 parts per million the allowed excess is 5 SCFM, giving a total of 125 SCFM of $NH_3$.

Experiments have shown that the $NH_3$ and $NO_x$ reduction across the SCR catalyst bed is equal; i.e., the moles of $NH_3$ consumed equal the moles of $NO_x$ reduced. Also, the reaction is first order; i.e., the fraction of $NH_3$ or $NO_x$ (whichever is in lowest concentration) reacted is independent of the concentration, e.g. in FIG. 1, the component of the reacting pair in lowest concentration is $NH_3$. A stage of catalyst can be defined as typically 0.0088 cubic feet of catalyst per SCFM of gas. For a typical catalyst of good activity, i.e., one which provides 60 percent reduction per stage, the $NH_3$ and $NO_x$ concentrations across a reactor containing 4 stages would be:

| Stage | 1 | 2 | 3 | 4 | |
|---|---|---|---|---|---|
| $NH_3$ in, ppm | 125 | 50 | 20 | 8 | 3.2 |
| $NO_x$ in, ppm | 300 | 225 | 195 | 183 | 178.2 |
| $\Delta NH_3$, ppm | | 75 | 30 | 12 | 4.8 |
| $\Delta NO_x$, ppm | | 75 | 30 | 12 | 4.8 |
| $\Delta NH_3$, % | | 60 | 60 | 60 | 60 |
| $\Delta NO_x$, % | | 25 | 13.3 | 6.2 | 2.6 |

The cumulative fractional reduction, $R_N$, of the $NH_3$ for N stages is given by $ln(1-R_N)=N\ ln(1-R_{N=1})$, where $R_{N=1}$ is the fractional reduction with one stage. Substituting and solving:

$$\text{SCR stages} = ln(1-120/125)/ln(1-0.6) = 3.51$$

Further, the catalyst volume can be shown to be equal to:

$$\text{Cat. Vol.} = 3.51 \times 1 \times 10^6 \times 0.0088 = 30,997 \text{ ft}^3$$

The conventional system thus requires a structure containing 30,997 cubic feet of catalyst, plus a flue gas fan capable of processing 1,000,000 SCFM of gas through the catalyst bed.

Figure 2:
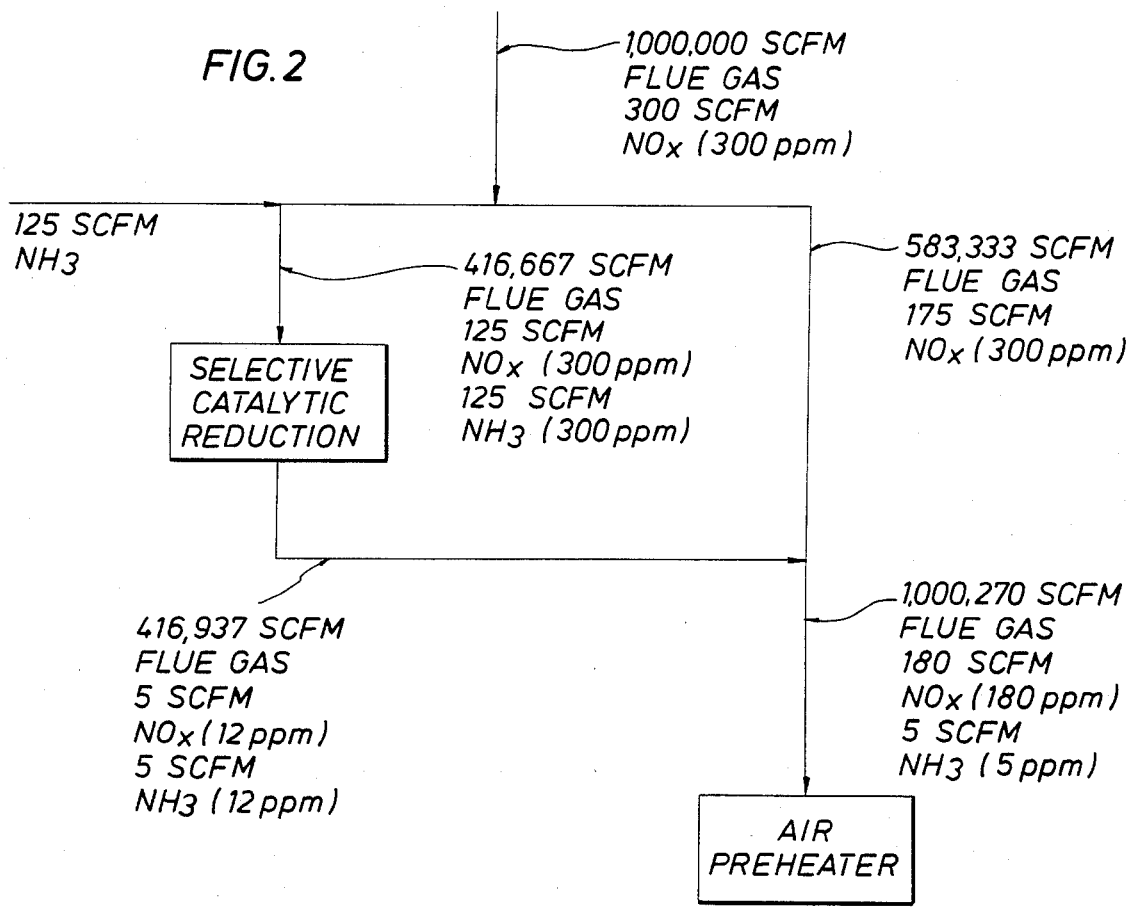
FIG. 2 shows the SCR $NO_x$ reduction system of the present invention.

Referring to FIG. 2, there is shown the process of the present invention in which a portion of the flue gas is processed through the SCR system while the remainder of the flue gas bypasses the SCR system. In particular, approximately 42 percent of the flue gas is passed through the SCR system where its $NO_x$ level is reduced from 300 to approximately 12 parts per million. Since the fraction of reduction of $NH_3$ (and $NO_x$ in this case) is the same (96%) as in FIG. 1, the number of required SCR stages is the same 3.51. The catalyst volume is calculated:

$$\text{Cat. Vol.} = 3.51 \times 416,667 \times 0.0088 = 12,914 \text{ ft}^3$$

When this catalyst volume is compared with the figures using the straight through system, it is seen that it is only approximately 42 percent of the previous system. Similarly, the fan horsepower is reduced significantly since the reactor pressure drop is supplied for only 42 percent of the flue gas.

When the processed portion of the flue gas is recombined with the mainstream prior to entering the air preheater, it is seen that the $NO_x$ has been reduced to 180 ppm the same as with the conventional system. Of course, if the $NO_x$ level is to be reduced to a lower level, more flue gas would have to be sent through the SCR processing system. In the example used, the net result of using the bypass is an overall saving in the cost of processing of approximately 58 percent of the flue gas. Not only is 58 percent of the catalyst saved, but the overall size, and thus the cost of the SCR system, is also reduced.

What is claimed is:

1. A process using $NH_3$ for reducing the $NO_x$ in a waste gas to a desired level of $NO_x$ while limiting the $NH_3$ in the treated waste gas to less than 10 parts per million, said process comprising:
    splitting the waste gas into two separate streams;
    treating one of the streams with an equal mole ratio of $NH_3$ to $NO_x$, giving a higher $NH_3/NO_x$ ratio, resulting in a substantial increase in $NO_x$ reduction; and
    recombining said two streams to produce a single stream having the desired concentration level of $NO_x$ and $NH_3$.

2. The process of claim 1 wherein selective noncatalytic reduction is used to reduce the $NO_x$ content of the treated stream.

3. The process of claim 1 wherein selective catalytic reduction is used to reduce the $NO_x$ content of the treated stream.

* * * * *